US012424136B2

(12) United States Patent
Cheng et al.

(10) Patent No.: US 12,424,136 B2
(45) Date of Patent: Sep. 23, 2025

(54) DRIVING METHOD FOR DISPLAY PANEL AND DISPLAY DEVICE

(71) Applicants: CHONGQING HKC OPTOELECTRONICS TECHNOLOGY CO., LTD., Chongqing (CN); HKC CORPORATION LIMITED, Shenzhen (CN)

(72) Inventors: Yi Cheng, Chongqing (CN); Haijiang Yuan, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

(*) Notice: Subject to any disclaimer, the term of this patent is extended or adjusted under 35 U.S.C. 154(b) by 45 days.

(21) Appl. No.: 18/515,630

(22) Filed: Nov. 21, 2023

(65) Prior Publication Data

US 2024/0395186 A1 Nov. 28, 2024

(30) Foreign Application Priority Data

May 25, 2023 (CN) ......................... 202310605034.2

(51) Int. Cl.
*G09G 3/32* (2016.01)
*G09G 3/20* (2006.01)

(52) U.S. Cl.
CPC ............. *G09G 3/2007* (2013.01); *G09G 3/32* (2013.01); *G09G 2320/0666* (2013.01)

(58) Field of Classification Search
None
See application file for complete search history.

(56) References Cited

U.S. PATENT DOCUMENTS

2021/0027719 A1* 1/2021 Cho ..................... G09G 3/3291
2022/0051610 A1* 2/2022 Nadershahi .......... G09G 3/2014

FOREIGN PATENT DOCUMENTS

CN 101010719 A 8/2007
CN 102290036 A 12/2011
(Continued)

OTHER PUBLICATIONS

The first office action issued in corresponding CN application No. 202310605034.2 dated Jun. 7, 2024.
(Continued)

*Primary Examiner* — Carl Adams
(74) *Attorney, Agent, or Firm* — HAUPTMAN HAM, LLP

(57) ABSTRACT

A driving method for a display panel and a display device are provided. The display panel includes multiple types of Light-Emitting Diodes (LEDs). Different types of LEDs have different light-emitting colors. The driving method for the display panel includes the following. Target driving-current values corresponding to the multiple types of LEDs are obtained. Each type of LED corresponds to a target driving-current value. Each type of LED corresponds to an adjusted driving-current value. For each type of LED, the adjusted driving-current value corresponding to the type of LED is different from the target driving-current value corresponding to the type of LED. Currents having corresponding target driving-current values are provided for the multiple types of LEDs respectively.

17 Claims, 4 Drawing Sheets

(56) References Cited

FOREIGN PATENT DOCUMENTS

| | | | |
|---|---|---|---|
| CN | 102573221 | A | 7/2012 |
| CN | 103151015 | A | 6/2013 |
| CN | 104247560 | A | 12/2014 |
| CN | 104538004 | A | 4/2015 |
| CN | 106205558 | A | 12/2016 |
| CN | 111445839 | A | 7/2020 |
| CN | 112908251 | A | 6/2021 |
| CN | 114519985 | A | 5/2022 |
| TW | 200839703 | A | 10/2008 |

OTHER PUBLICATIONS

Notice of allowance issued in corresponding CN application No. 202310605034.2 dated Oct. 25, 2024.

* cited by examiner

DRIVING METHOD FOR DISPLAY PANEL AND DISPLAY DEVICE

CROSS-REFERENCE TO RELATED APPLICATIONS

This application claims priority under 35 U.S.C. § 119 (a) to Chinese Patent Application No. 202310605034.2, filed May 25, 2023, the entire disclosure of which is incorporated herein by reference.

TECHNICAL FIELD

This disclosure relates to the field of display technology, and in particular to a driving method for a display panel and a display device.

BACKGROUND

In recent years, with development of the technologies of Light-Emitting Diode (LED) display screens and increase in market demands, the LED display screen has become ubiquitous in public places such as shopping malls, rail transit, etc., and is used for displaying information such as pictures, texts, videos, etc.

At present, when the LED display screen displays, an LED is affected by parasitic capacitance, and a phenomenon of white balance color shift occurs in a displayed image, which is more serious especially when an image with a low grayscale value is displayed, resulting in a poor display effect.

SUMMARY

In one aspect of the present disclosure, a driving method for a display panel is provided. The display panel includes multiple types of Light-Emitting Diodes (LEDs). Different types of LEDs have different light-emitting colors. The driving method for the display panel includes the following. Target driving-current values corresponding to the multiple types of LEDs are obtained. Each type of LED corresponds to a target driving-current value. Currents having corresponding adjusted driving-current values are provided for the multiple types of LEDs. Said each type of LED corresponds to an adjusted driving-current value. For said each type of LED, the adjusted driving-current value corresponding to the type of LED is different from the target driving-current value corresponding to the type of LED. Currents having corresponding target driving-current values are provided for the multiple types of LEDs respectively.

In another aspect of the present disclosure, a display device is provided. The display device includes a display panel, a memory, and a processor. The memory is configured to store computer programs. The processor is configured to invoke the computer programs to invoke a driving method for the display panel. The display panel includes multiple types of LEDs. Different types of LEDs have different light-emitting colors. The driving method for the display panel includes the following. Target driving-current values corresponding to the multiple types of LEDs are obtained. Each type of LED corresponds to a target driving-current value. Currents having corresponding adjusted driving-current values are provided for the multiple types of LEDs. Said each type of LED corresponds to an adjusted driving-current value. For said each type of LED, the adjusted driving-current value corresponding to the type of LED is different from the target driving-current value corresponding to the type of LED. Currents having corresponding target driving-current values are provided for the multiple types of LEDs respectively.

BRIEF DESCRIPTION OF THE DRAWINGS

To explain technical solutions in implementations of the present disclosure more clearly, the following will give a brief introduction to accompanying drawings which are needed to be used in implementations. Apparently, the accompanying drawings in the following description are some implementations of the present disclosure. For those of ordinary skill in the art, other accompanying drawings can be obtained according to these accompanying drawings without creative efforts.

DETAILED DESCRIPTION

Technical solutions of implementations of the present disclosure will be described clearly and completely with reference to accompanying drawings in embodiments of the present disclosure. Apparently, embodiments described herein are merely some embodiments, rather than all embodiments, of the present disclosure. Based on embodiments of the present disclosure, all other embodiments obtained by those of ordinary skill in the art without creative effort shall fall within the protection scope of the present disclosure.

In the description of the present disclosure, the terms such as “first”, “second”, “third”, “fourth”, “fifth”, “sixth”, “seventh”, “eighth”, etc., are used to different objects, rather than describing a specific sequence, and therefore cannot be construed as a limitation to the present disclosure.

In the description of the present disclosure, unless specified or limited otherwise, terms “coupling”, “connecting”, and the like should be understood in broader sense. For example, coupling may be a fixed coupling, a detachable coupling, or an integrated coupling; may be a direct coupling, or an indirect coupling through an intermediary, or an inner communication of two elements; may be a communication coupling; and may be an electrical coupling. For those of ordinary skill in the art, the specific meanings of the above terms in the present disclosure can be understood according to specific situations.

Figure 1:
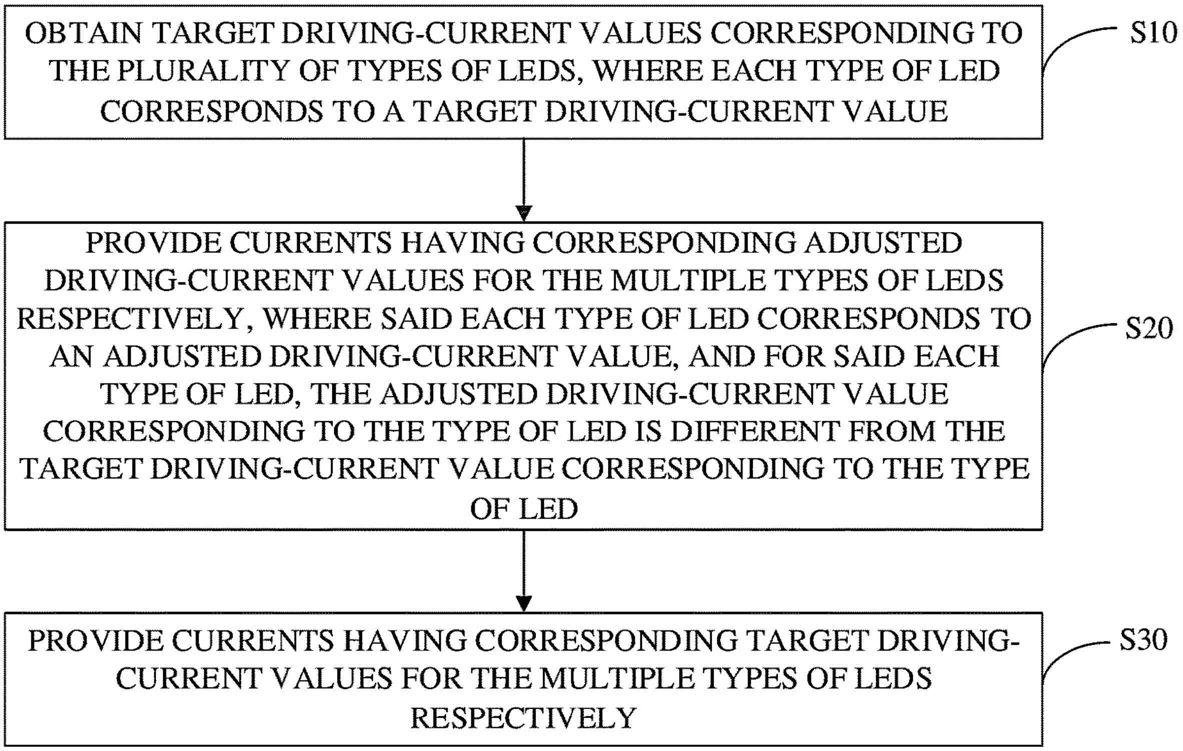
FIG. 1 is a flowchart of a driving method of a display panel provided in an embodiment of the present disclosure.

Reference can be made to FIG. 1, where FIG. 1 is a flowchart of a driving method of a display panel provided in an embodiment of the present disclosure. A driving compensation method for a display panel is for a display panel. The display panel includes multiple types of Light-Emitting Diodes (LEDs). Different LEDs have different light-emitting colors. As illustrated in FIG. 1, the driving method for the display panel includes the following.

At S10, target driving-current values corresponding to the multiple types of LEDs are obtained, where each type of LED corresponds to a target driving-current value.

At S20, currents having corresponding adjusted driving-current values are provided for the multiple types of LEDs respectively, where said each type of LED corresponds to an adjusted driving-current value, and for said each type of LED, the adjusted driving-current value corresponding to the type of LED is different from the target driving-current value corresponding to the type of LED.

At S30, currents having corresponding target driving-current values are provided for the multiple types of LEDs respectively.

For the driving method for the display panel provided in embodiments of the present disclosure, before a current having the target driving-current value is input, a current having a magnitude different from the target driving-current value is input, that is, a current having the adjusted driving-current value is input, so that the magnitude of the current flowing through the LED can reach the target driving-current value corresponding to the LED more quickly. Thus, conduction time of the LED is prolonged, and part of the current that is input to the LED and has the adjusted driving-current value can be used for consumption of the parasitic capacitance, thereby reducing the influence of the parasitic capacitance and solving the problem of white balance color shift.

The adjusted driving-current values corresponding to the multiple types of LEDs may be the same or different.

In some embodiments, the multiple types of LEDs include three types of LEDs. Light-emitting colors of the three types of LEDs are red, blue, and green respectively. The number of (that is, how many) LEDs of each type of LED is at least one. The multiple types of LEDs may be arranged in an array, or arranged in other arrangement manners. An LED emitting red light, an LED emitting blue light, and an LED emitting green light correspond to different target driving-current values respectively. The LED emitting red light, the LED emitting blue light, and the LED emitting green light correspond to the same or different adjusted driving-current values respectively.

In other embodiments, the multiple types of LEDs may include LEDs having other light-emitting colors.

In some embodiments, before the currents having the corresponding adjusted driving-current values are provided for the multiple types of LEDs, the driving method for the display panel further includes the following. A present grayscale value of the display panel and a target grayscale value of the display panel are obtained. The adjusted driving-current values corresponding to the multiple types of LEDs are determined according to the present grayscale values and the target grayscale values.

The multiple types of LEDs have the same present grayscale values, and the multiple types of LEDs have the same target grayscale values, so that the multiple types of LEDs emit light with the same brightness, and thus the display panel emits white light.

The adjusted driving-current value is determined according to the present grayscale value and the target grayscale value, and the obtained adjusted driving-current value considers factors of the present grayscale value and the target grayscale value, that is, the adjusted driving-current value is related to the present grayscale value and the target grayscale value, which is beneficial to providing an appropriate adjusted driving-current value for the LED based on the magnitude of the current of the present LED and the magnitude of the current that the present LED needs to reach, so that after the current having the corresponding adjusted driving-current value is provided for the LED, not only can a ramp-up rate of the actual current value of the LED be improved, but also can avoid the actual current value of the LED exceeding the target driving-current value before the current having the target driving-current value is input to the LED. Therefore, the actual current value of the LED can be gradually increased or decreased from the current value to the corresponding target driving-current value.

When the multiple types of LEDs include a LED emitting red light, a LED emitting blue light, and a LED emitting green light, the LED emitting red light, the LED emitting blue light, and the LED emitting green light have the same present grayscale values, and the same target grayscale values. The adjusted driving-current values corresponding to the multiple types of LEDs are determined, according to the present grayscale value and the target grayscale value, as follows. According to the present grayscale value and the target grayscale value, an adjusted driving-current value corresponding to the LED emitting red light is determined, an adjusted driving-current value corresponding to the LED emitting blue light is determined, and an adjusted driving-current value corresponding to the LED emitting green light is determined.

In some embodiments, the adjusted driving-current values corresponding to the multiple types of LEDs are determined, according to the present grayscale value and the target grayscale value, as follows. When the present grayscale value is less than the target grayscale value, the adjusted driving-current values corresponding to the multiple types of LEDs are determined to be greater than the target driving-current values corresponding to the multiple types of LEDs respectively, that is, for each type of LED, the adjusted driving-current value corresponding to the type of LED is greater than the target driving-current value corresponding to the LED. When the present grayscale value is greater than the target grayscale value, the adjusted driving-current values corresponding to the multiple types of LEDs are determined to be less than the target driving-current values corresponding to the multiple types of LEDs respectively, that is, for each type of LED, the adjusted driving-current value corresponding to the type of LED is less than the target driving-current value corresponding to the type of LED.

When the present grayscale value is less than the target grayscale value, the adjusted driving-current value is determined to be greater than the target driving-current value, that is, when the LED changes from the present grayscale value to the target grayscale value, a current having a magnitude greater than the target driving-current value is provided for the LED, and then a current having a magnitude equal to the target driving-current value is provided for the LED, so that the magnitude of the current flowing through the LED can reach the target driving-current value more quickly, which is equivalent to increasing the ramp-up rate of the current, causing the magnitude of the current to rise to the target driving-current value more quickly. Therefore, the conduction time of the LED with the target driving-current value can be prolonged, and part of the current that is input to the LED and has the adjusted driving-current value can be used for the consumption of the parasitic capacitance, thereby reducing the influence of the parasitic capacitance and solving the problem of white balance color shift.

Figure 2:
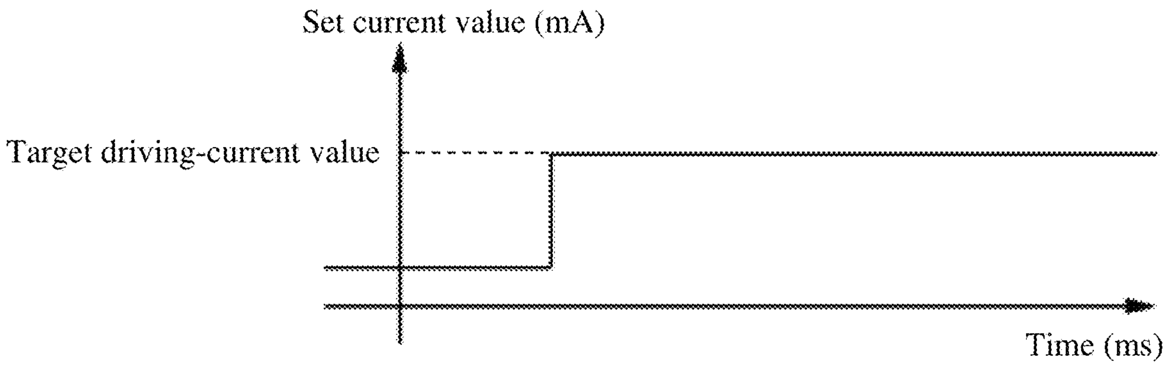
FIG. 2 (Prior Art)
FIG. 2 is a schematic diagram of a relationship between set current values and current input time of certain Light-Emitting Diodes (LEDs).
Figure 3:
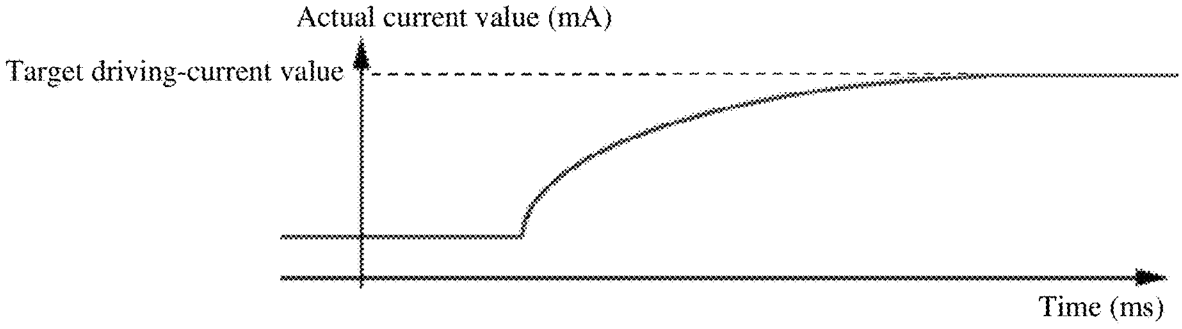
FIG. 3 (Prior Art)
FIG. 3 is a schematic diagram of a relationship between actual current values and the current input time of the certain LEDs in FIG. 2.
Figure 4:
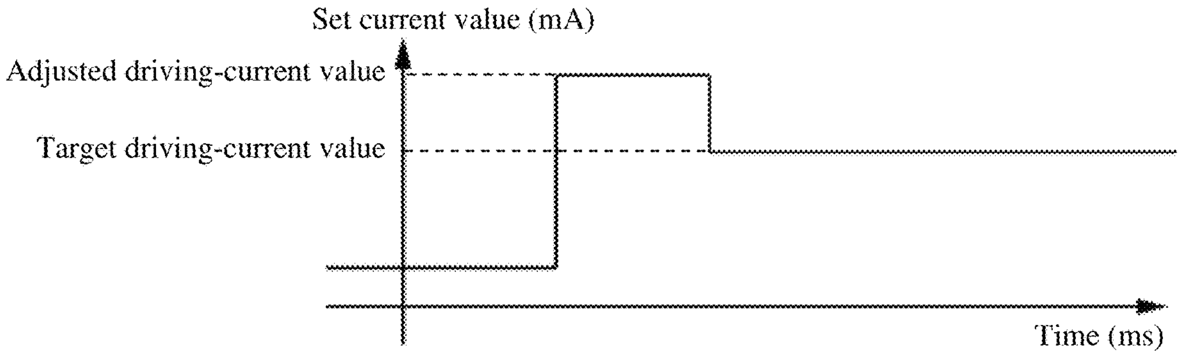
FIG. 4 is a schematic diagram of a relationship between set current values and current input time of certain LEDs provided in embodiments of the present disclosure.
Figure 5:
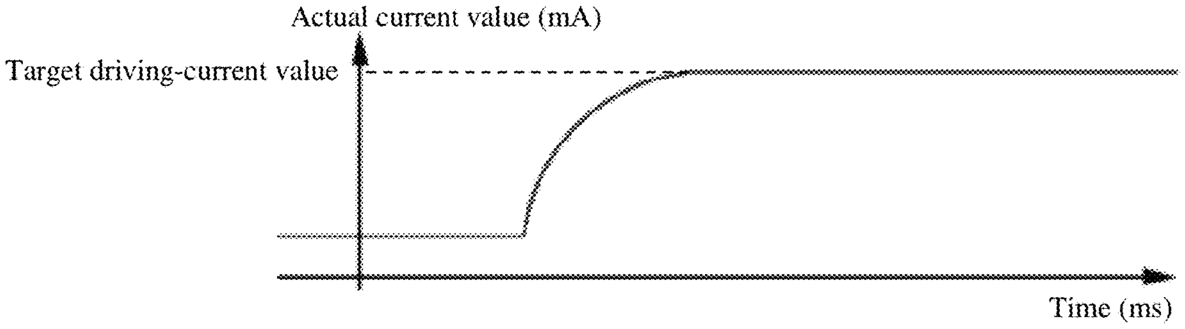
FIG. 5 is a schematic diagram of a relationship between actual current values and the current input time of the certain LEDs in FIG. 4.

Exemplarily, reference can be made to FIG. 2 to FIG. 5, where FIG. 2 is a schematic diagram of a relationship between set current values and current input time of certain LEDs, FIG. 3 is a schematic diagram of a relationship between actual current values and the current input time of certain LEDs in FIG. 2, FIG. 4 is a schematic diagram of a relationship between set current values and current input time of certain LEDs provided in embodiments of the present disclosure, and FIG. 5 is a schematic diagram of a relationship between actual current values and the current input time of certain LEDs in FIG. 4. FIG. 4 and FIG. 5 illustrate a situation where the present grayscale value is less than the target grayscale value. It can be seen from FIG. 2 to FIG. 5 that compared to a change relationship between an actual current magnitude and conduction time of an existing LED, in this embodiment of the present disclosure, the current having the adjusted driving-current value greater than the target driving-current value is provided first, so that the magnitude of the current flowing through the LED can reach the target driving-current value more quickly, thereby prolonging the conduction time of the LED.

When the present grayscale value is greater than the target grayscale value, the adjusted driving-current value is determined to be greater than the target driving-current value, That is, when the LED changes from the present grayscale value to the target grayscale value, the current with a magnitude less than the target driving-current value is supplied to the LED, so that the magnitude of the current flowing through the LED can reach the target driving-current value more quickly, which is equivalent to increasing a ramp-down rate of the current, causing the current to drop to the target driving-current more quickly. Therefore, the conduction time of the LED at the target driving-current value can be prolonged, and part of the current input to the LED can be used for the consumption of the parasitic capacitance, thereby reducing the influence of the parasitic capacitance and solving the problem of white balance color shift.

Exemplarily, when the present grayscale value is 16 and the target grayscale value is 32, a target driving-current value corresponding to a certain type of LED is 10 mA, and an adjusted driving-current value corresponding to the certain type of LED is greater than 10 mA. When the present grayscale value is 64 and the target grayscale value is 32, a target driving-current value corresponding to a certain type of LED is 10 mA, and an adjusted driving-current value corresponding to the certain type of LED is less than 10 mA.

On the condition that the multiple types of LEDs include a LED emitting red light, a LED emitting blue light, and a LED emitting green light, when the present grayscale value is less than the target grayscale value, an adjusted driving-current value corresponding to the LED emitting red light is greater than a target current value corresponding to the LED emitting red light, an adjusted driving-current value corresponding to the LED emitting blue light is greater than a target current value corresponding to the LED emitting blue light, and an adjusted driving-current value corresponding to the LED emitting green light is greater than a target current value corresponding to the LED emitting green light; and when the present grayscale value is greater than the target grayscale value, the adjusted driving-current value corresponding to the LED emitting red light is less than the target current value corresponding to the LED emitting red light, the adjusted driving-current value corresponding to the LED emitting blue light is less than the target current value corresponding to the LED emitting blue light, and the adjusted driving-current value corresponding to the LED emitting green light is less than the target current value corresponding to the LED emitting green light.

In some embodiments, the multiple types of LEDs reach corresponding target driving-current values at the same time, that is, the multiple types of LEDs reach their respective target driving-current values at the same time.

Figure 6:
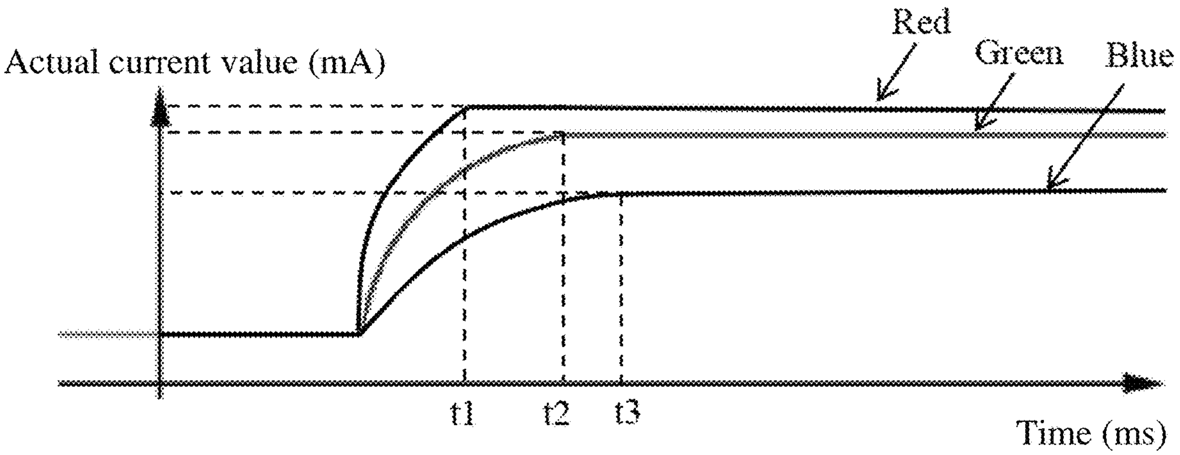
FIG. 6 (Prior Art)
FIG. 6 is a schematic diagram of relationships between actual current values and current input time of LEDs of three types of colors in certain display panels.
Figure 7:
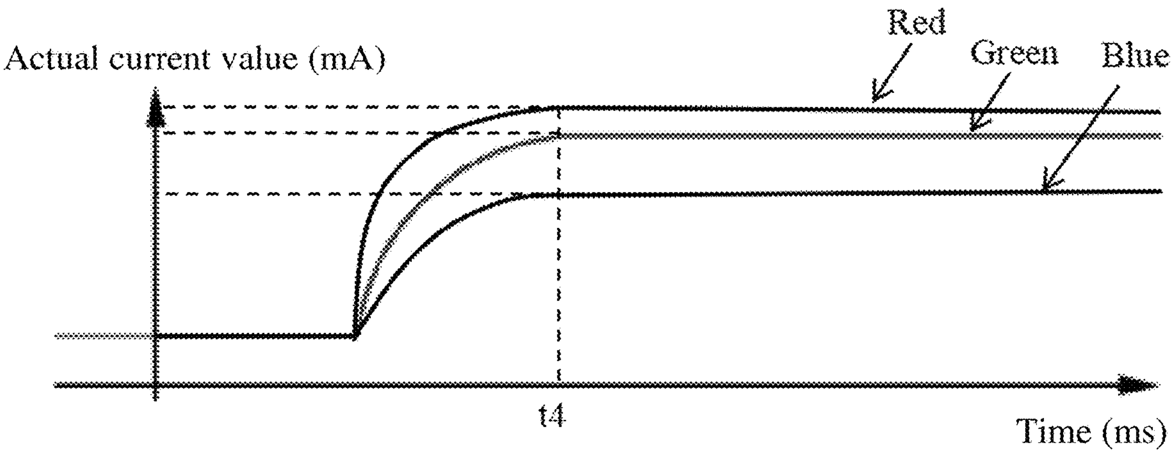
FIG. 7 is a schematic diagram of relationships between actual current values and current input time of LEDs of three types of colors provided in an embodiment of the present disclosure.

When the multiple types of LEDs include a LED emitting red light, a LED emitting blue light, and a LED emitting green light, at the same time, the LED emitting red light reaches a corresponding targe driving-current value, the LED emitting blue light reaches a corresponding targe driving-current value, and the LED emitting green light reaches a corresponding targe driving-current value. Exemplarily, reference can be made to FIG. 6 and FIG. 7, where FIG. 6 is a schematic diagram of relationships between actual current values and current input time of LEDs of three types of colors in certain display panels, and FIG. 7 is a schematic diagram of relationships between actual current values and current input time of LEDs of three types of colors provided in an embodiment of the present disclosure. As illustrated in FIG. 6 and FIG. 7, when the three types of LEDs have the same target grayscale values, that is, when the three types of LEDs have the same target brightness, the target driving-current value of the LED emitting blue light, the target grayscale value of the LED emitting green light, and the target driving-current value of the LED emitting red light are increased in sequence. As illustrated in FIG. 6, due to existence of the parasitic capacitance, part of the current input to the LED may be used for the consumption of the parasitic capacitance, so that the actual current value of the LED needs a longer time to reach the corresponding target driving-current value. In addition, time required for the three types of LEDs to reach respective corresponding target driving-current values may be different, resulting in uneven light emission and color shift. As illustrated in FIG. 7, since the ramp-up rate of the current of each type of LED is improved, the three types of LEDs can reach their respective corresponding target driving-current values at the same time, thereby solving the problem of white balance color shift.

In some embodiments, the adjusted driving-current values corresponding to the multiple types of LEDs are determined, according to the present grayscale value and the target grayscale value, as follows. A target grayscale-correction-value corresponding to each type of LED is determined, according to the present grayscale value and the target grayscale value. The adjusted driving-current value corresponding to each type of LED is determined, according to the target grayscale value and the target grayscale-correction-value corresponding to each type of LED.

Each type of LED corresponds to a target grayscale-correction-value. Target grayscale-correction-values corresponding to the multiple types of LEDs may be the same or different.

When the multiple types of LEDs include a LED emitting red light, a LED emitting blue light, and a LED emitting green light, the target grayscale-correction-value corresponding to each type of LED is determined, according to the present grayscale value and the target grayscale value, as follows. According to the present grayscale value and the target grayscale value, a target grayscale-correction-value corresponding to the LED emitting red light is determined, a target grayscale-correction-value corresponding to the LED emitting blue light is determined, and a target grayscale-correction-value corresponding to the LED emitting green light is determined. The adjusted driving-current value corresponding to each type of LED is determined, according to the present grayscale value and the target grayscale-correction-value corresponding to each type of LED, as follows. An adjusted driving-current value corresponding to the LED emitting red light is determined, according to the target grayscale value and the target grayscale-correction-value corresponding to the LED emitting red light; an adjusted driving-current value corresponding to the LED emitting blue light is determined, according to the target grayscale value and the target grayscale-correction-value corresponding to the LED emitting blue light; and an adjusted driving-current value corresponding to the LED emitting green light is determined, according to the target grayscale value and the target grayscale-correction-value corresponding to the LED emitting green light.

In some embodiments, the target grayscale-correction-value corresponding to each type of LED is determined, according to the present grayscale value and the target grayscale value, as follows. The target grayscale-correction-value corresponding to each type of LED is determined, according to the present grayscale value, the target grayscale value, and a preset grayscale-correction-value lookup table, where the grayscale-correction-value lookup table records a correspondence between present grayscale values, target grayscale values, and grayscale correction values of each type of LED. The adjusted driving-current value corresponding to each type of LED is determined, according to the target grayscale value and the target grayscale-correction-value corresponding to each type of LED.

The target grayscale-correction-value corresponding to each type of LED may be quickly obtained by looking up the grayscale-correction-value lookup table.

The display panel may include a storage module. The grayscale-correction-value lookup table may be established in advance and stored in the storage module in advance. The storage module may be a non-volatile memory.

In some embodiments, the target grayscale-correction-value corresponding to each type of LED is determined, according to the present grayscale value, the target grayscale value, and the preset grayscale-correction-value lookup table, as follows. When the present grayscale value is the same as one of present grayscale values recorded in the grayscale-correction-value lookup table, and the target grayscale value is the same as one of target grayscale values recorded in the grayscale-correction-value lookup table, and the target grayscale-correction-value corresponding to each type of LED is obtained by looking up the grayscale-correction-value lookup table according to the present grayscale value and the target grayscale value.

In other embodiments, the target grayscale-correction-value corresponding to each type of LED is determined, according to the present grayscale value, the target grayscale value, and the preset grayscale-correction-value lookup table, as follows. When the present grayscale value is different from a present grayscale value recorded in the grayscale-correction-value lookup table and/or the target grayscale value is different from a target grayscale value recorded in the grayscale-correction-value lookup table, the target grayscale-correction-value corresponding to each type of LED is calculated by a linear interpolation method.

When the present grayscale value is different from the present grayscale value recorded in the grayscale-correction-value lookup table, and the target grayscale value is the same as the target grayscale value recorded in the grayscale-correction-value lookup table, a first present-grayscale-value greater than the present grayscale value of the display panel and a second present-grayscale-value less than the present grayscale value of the display panel are selected from the grayscale-correction-value lookup table, a first grayscale-correction-value corresponding to the first present-grayscale-value and the target grayscale value is obtained by looking up the grayscale-correction-value lookup table, and a second grayscale-correction-value corresponding to the second present-grayscale-value and the target grayscale value is obtained by looking up the grayscale-correction-value lookup table. Based on the first grayscale-correction-value, the second grayscale-correction-value, the first present-grayscale-value, the second present-grayscale-value, and the present grayscale value of the display panel, the present grayscale value of the display panel and the target grayscale-correction-value corresponding to the target grayscale value are calculated by the linear interpolation method.

When the present grayscale value is the same as the present grayscale value recorded in the grayscale-correction-value lookup table, and the target grayscale value is different from the target grayscale value recorded in the grayscale-correction-value lookup table, a first target-grayscale-value greater than the target grayscale value of the display panel and a second target-grayscale-value less than the target grayscale value of the display panel are selected from the grayscale-correction-value lookup table, a third grayscale-correction-value corresponding to the first target-grayscale-value and the present grayscale value is obtained by lookup the grayscale-correction-value lookup table, and a fourth grayscale-correction-value corresponding to the second target-grayscale-value and the present grayscale value is obtained by lookup the grayscale-correction-value lookup table. Based on the third grayscale-correction-value, the fourth grayscale-correction-value, the first target-grayscale-value, the second target-grayscale-value, and the target grayscale value of the display panel, the target grayscale value of the display panel and the target grayscale-correction-value corresponding to the present grayscale value are calculated by the linear interpolation method.

When the present grayscale value is different from the present grayscale value recorded in the grayscale-correction-value lookup table, and the target grayscale value is different from the target grayscale value recorded in the grayscale-correction-value lookup table, a third present-grayscale-value greater than the present grayscale value of the display panel and a fourth present-grayscale-value less than the present grayscale value of the display panel are selected from the grayscale-correction-value lookup table, a third target-grayscale-value greater than the target grayscale value of the display panel and a fourth target-grayscale-value less than the target grayscale value of the display panel are selected from the grayscale-correction-value lookup table, a fifth grayscale-correction-value corresponding to the third target-grayscale-value the third present-grayscale-value is obtained by looking up the grayscale-correction-value lookup table, a sixth grayscale-correction-value corresponding to the fourth target-grayscale-value and the fourth present-grayscale-value is obtained by looking up the grayscale-correction-value lookup table, a seventh grayscale-correction-value corresponding to the third present-grayscale-value and the fourth target-grayscale-value is obtained by looking up the grayscale-correction-value lookup table, and an eighth grayscale-correction-value corresponding to the fourth present-grayscale-value and the third target-grayscale-value is obtained by looking up the grayscale-correction-value lookup table. Based on the third present-grayscale-value, the fourth present-grayscale-value, the third target-grayscale-value, the fourth target-grayscale-value, the fifth grayscale-correction-value, the sixth grayscale-correction-value, the seventh grayscale-correction-value, the eighth grayscale-correction-value, and the present grayscale value and the target grayscale value of the display panel, the target grayscale value of the display panel and the target grayscale-correction-value corresponding to the present grayscale value are calculated by the linear interpolation method.

In some embodiments, the preset grayscale-correction-value lookup table includes multiple preset grayscale-correction-value lookup tables, and each type of LED corresponding to the LED emitting blue light is determined, according to the present grayscale value, the target grayscale value, and a preset grayscale correction value table corresponding to the LED emitting blue light; and a target grayscale-correction-value corresponding to the LED emitting green light is determined, according to the present grayscale value, the target grayscale value, and a preset grayscale-correction-value lookup table corresponding to the LED emitting green light.

Exemplarily, as illustrated in Table 1, Table 1 is a lookup table for grayscale correction values corresponding to LEDs emitting green light provided in embodiments of the present disclosure. When the present grayscale value is 0 and the target grayscale value is 16, it is determined that the target grayscale-correction-value corresponding to the LED emitting green light is 2.

TABLE 1

| Target grayscale values | Grayscale correction values | | | | | | | | | | | | | | | | |
|---|---|---|---|---|---|---|---|---|---|---|---|---|---|---|---|---|---|
| 256 | 0 | 0 | 0 | 0 | 0 | 0 | 0 | 0 | 0 | 0 | 0 | 0 | 0 | 0 | 0 | 0 | 0 |
| 240 | 6 | 8 | 8 | 8 | 8 | 8 | 6 | 6 | 6 | 5 | 4 | 4 | 3 | 3 | 3 | 0 | −4 |
| 224 | 8 | 9 | 8 | 8 | 8 | 8 | 7 | 7 | 7 | 6 | 6 | 5 | 4 | 4 | 0 | −5 | −7 |
| 208 | 14 | 14 | 13 | 11 | 10 | 8 | 7 | 7 | 7 | 7 | 6 | 5 | 4 | 0 | −5 | −7 | −11 |
| 192 | 15 | 15 | 15 | 13 | 12 | 10 | 8 | 9 | 9 | 8 | 7 | 6 | 0 | −7 | −7 | −11 | −16 |
| 1176 | 16 | 18 | 17 | 15 | 14 | 12 | 10 | 9 | 9 | 6 | 6 | 0 | −6 | −9 | −10 | −12 | −19 |
| 160 | 17 | 19 | 18 | 16 | 15 | 13 | 11 | 9 | 9 | 8 | 0 | −6 | −5 | −10 | −12 | −14 | −23 |
| 144 | 18 | 21 | 20 | 18 | 16 | 14 | 12 | 12 | 5 | 0 | −8 | −6 | −7 | −16 | −16 | −19 | −26 |
| 128 | 20 | 20 | 18 | 16 | 14 | 12 | 10 | 8 | 0 | −6 | −8 | −8 | −9 | −21 | −22 | −23 | −35 |
| 112 | 21 | 19 | 18 | 16 | 15 | 13 | 7 | 0 | −9 | −9 | −9 | −9 | −10 | −21 | −28 | −28 | −42 |
| 96 | 20 | 17 | 18 | 16 | 15 | 8 | 0 | −9 | −11 | −12 | −13 | −14 | −15 | −26 | −27 | −28 | −40 |
| 80 | 16 | 16 | 14 | 9 | 8 | 0 | −9 | −13 | −15 | −16 | −17 | −18 | −19 | −22 | −23 | −24 | −35 |
| 64 | 12 | 14 | 13 | 5 | 0 | −5 | −10 | −15 | −17 | −18 | −19 | −20 | −21 | −23 | −24 | −25 | −35 |
| 48 | 6 | 8 | 4 | 0 | −5 | −12 | −14 | −18 | −21 | −22 | −23 | −24 | −25 | −27 | −28 | −29 | −33 |
| 32 | 4 | 4 | 0 | −4 | −8 | −8 | −14 | −16 | −20 | −22 | −23 | −24 | −25 | −27 | −28 | −29 | −30 |
| 16 | 2 | 0 | −2 | −6 | −9 | −9 | −11 | −14 | −16 | −16 | −16 | −16 | −16 | −16 | −16 | −16 | −16 |
| 0 | 0 | 0 | 0 | 0 | 0 | 0 | 0 | 0 | 0 | 0 | 0 | 0 | 0 | 0 | 0 | 0 | 0 |
| G | 0 | 16 | 32 | 48 | 64 | 80 | 96 | 112 | 128 | 144 | 160 | 176 | 192 | 208 | 224 | 240 | 256 |
| | Present grayscale values | | | | | | | | | | | | | | | | |

sponds to one preset grayscale-correction-value lookup table. The target grayscale-correction-value corresponding to each type of LED is determined, according to the present grayscale value, the target grayscale value, and the preset grayscale-correction-value lookup table, as follows. According to the present grayscale value, the target grayscale value, and the preset grayscale-correction-value lookup table corresponding to each type of LED, the target grayscale-correction-value corresponding to each type of LED is determined, and then the target grayscale-correction-values corresponding to all LEDs are obtained.

When the multiple types of LEDs include a LED emitting red light, a LED emitting blue light, and a LED emitting green light, the preset grayscale-correction-value lookup table includes three preset grayscale-correction-value lookup tables. The target grayscale-correction-value corresponding to each type of LED is determined, according to the present grayscale value, the target grayscale value, and the preset grayscale-correction-value lookup table corresponding to each type of LED, as follows. A target grayscale-correction-value corresponding to the LED emitting red light is determined, according to the present grayscale value, the target grayscale value, and a preset grayscale-correction-value look-up table corresponding to the LED emitting red light; a target grayscale-correction-value corresponding to the LED emitting blue light is determined, ...

When the present grayscale value is different from the present grayscale value recorded in the grayscale-correction-value lookup table, and the target grayscale value is the same as the target grayscale value recorded in the grayscale-correction-value lookup table, for example, the present grayscale value of the display panel is 18, the target grayscale value of the display panel is 64, the first grayscale-correction-value corresponding to the present grayscale value of 16 is obtained to be 14 by looking up the grayscale-correction-value lookup table, and the second grayscale-correction-value corresponding to the present grayscale value of 32 is obtained to be 13 by looking up the grayscale-correction-value lookup table, and the target grayscale-correction-value corresponding to the LED is an integer part of (13−14)/(32−16)*(18−16)+14, i.e., 13.

When the present grayscale value is the same as the present grayscale value recorded in the grayscale-correction-value lookup table, and the target grayscale value is different from the target grayscale value recorded in the grayscale-correction-value lookup table, for example, the present grayscale value of the display panel is 16, the target grayscale value of the display panel is 70, the third grayscale-correction-value corresponding to the target grayscale value of 64 is obtained to be 14 by looking up the grayscale-correction-value lookup table, the fourth grayscale-correction-value corresponding to the present grayscale value of 80 is obtained to be 16 by looking up the grayscale-correction-value lookup table, and the target grayscale-correction-value corresponding to the LED is an integer part of (16−14)/(80−64)*(70-64)+14, i.e., 14.

When the present grayscale value is different from the present grayscale value recorded in the grayscale-correction-value lookup table, and the target grayscale value is different from the target grayscale value recorded in the grayscale-correction-value lookup table, for example, the present grayscale value of the display panel is 18, the target grayscale value of the display panel is 70, the fifth grayscale-correction-value corresponding to the target grayscale value of 80 and the present grayscale value of 32 is obtained to be 14 by looking up the grayscale-correction-value lookup table, the sixth grayscale-correction-value corresponding to the target grayscale value of 64 and the present grayscale value of 16 is obtained to be 14 by looking up the grayscale-correction-value lookup table, the seventh grayscale-correction-value corresponding to the target grayscale value of 64 and the present grayscale value of 32 is obtained to be 13 by looking up the grayscale-correction-value lookup table, the eighth grayscale-correction-value corresponding to the target grayscale value of 80 and the present grayscale value of 16 is obtained to be 16 by looking up the grayscale-correction-value lookup table, a grayscale correction value corresponding to the fourth present-grayscale-value and the target grayscale value of the display panel is calculated to be an integer part of (16−14)/(80−64)*(70-64)+14, i.e., 14, a grayscale correction value corresponding to the third present-grayscale-value and the target grayscale value of the display panel is calculated to be an integer part of (14−13)/(80−64)*(70−64)+13, i.e., 13, and the target grayscale-correction-value corresponding to the LED is an integer part of (14−13)/(16−32)*(18-32)+13, i.e., 13.

In other embodiments, the preset grayscale-correction-value lookup table may include one grayscale-correction-value lookup table, and the grayscale-correction-value lookup table records correspondences between present grayscale values, target grayscale values, and grayscale correction values corresponding to different types of LEDs, and a target grayscale-correction-value corresponding to one type of LED may be determined according to a light-emitting color of the LED, a present grayscale value, and a target grayscale value.

In some embodiments, each type of LED corresponds to a preset correspondence between grayscale values and driving-current values, and the preset correspondence between the grayscale values and the driving-current values defines that the grayscale values are positively correlated with the driving-current values.

Figure 8:
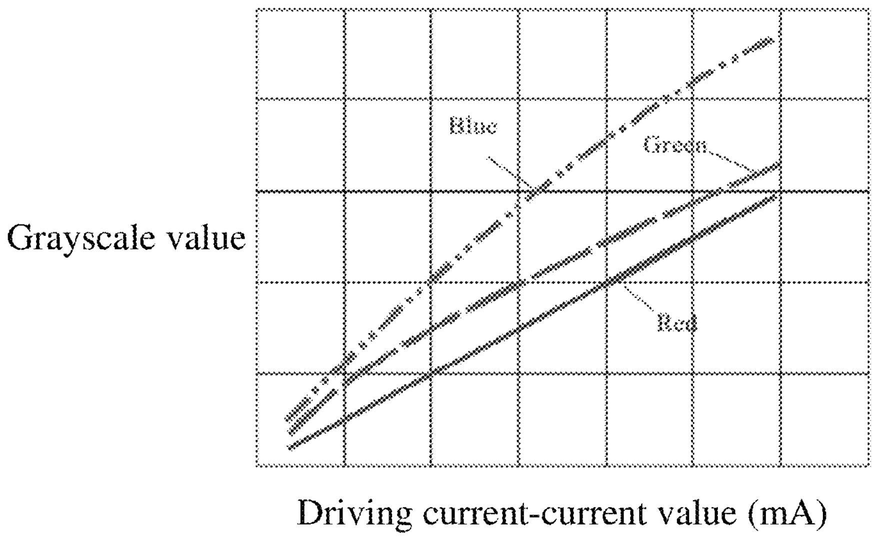
FIG. 8 is a schematic diagram of preset correspondences corresponding to multiple types of LEDs between grayscale values and driving-current values provided in an embodiment of the present disclosure.

Reference can be made to FIG. 8, where is a schematic diagram of preset correspondence corresponding to multiple types of LEDs between grayscale values and driving-current values provided in an embodiment of the present disclosure. As illustrated in FIG. 8, a preset correspondence between a grayscale value and a driving-current value corresponding to a LED emitting red light, a preset correspondence between a grayscale value and a driving-current value corresponding to a LED emitting blue light, and a preset correspondence between the grayscale value and a driving-current value corresponding to a LED emitting green light are different. At the same grayscale value, the driving-current value corresponding to the LED emitting red light, the driving-current value corresponding to the LED emitting green light, and the driving-current value corresponding to the LED emitting blue light decrease in sequence. In other words, to realize the same light-emitting brightness, the driving-current value required for the LED emitting red light, the driving-current value required for the LED emitting green light, and the driving-current value required for the LED emitting blue light decrease in sequence.

Since the grayscale value of each type of LED is positively correlated with the driving-current value, when the target grayscale value of the display panel is small, that is, when the display panel is in a low grayscale, the driving-current value corresponding to the LED emitting red light, the driving-current value corresponding to the LED emitting green light, and the driving-current value corresponding to the LED emitting blue light each are small, part of the current input is used for the loss of the parasitic capacitance. Therefore, the light-emitting brightness of the three types of LEDs will be affected by the parasitic capacitance and cannot realize the target brightness, so that the light-emitting brightness of the three types of LEDs is inconsistent, resulting in uneven light emission and color shift. However, in embodiments of the present disclosure, an adjusted driving-current of which the magnitude is different from the target driving-current value is provided firstly, so that the magnitude of the current flowing through the LED can reach the corresponding target driving-current value more quickly, which is equivalent to prolonging the conduction time of the LED at the target driving-current value, thereby offsetting the influence generated by the parasitic capacitance and solving the problem of white balance color shift.

In some embodiments, the adjusted driving-current value corresponding to each type of LED is determined, according to the target grayscale value and the target grayscale-correction-value corresponding to each type of LED, as follows. The target grayscale value and the target grayscale-correction-value corresponding to each type of LED are added, to obtain a target grayscale value corrected of each type of LED. When the present grayscale value is less than the target grayscale value, the target grayscale-correction-value corresponding to each type of LED is a positive value, and an obtained target grayscale value corrected is greater than the target grayscale value. When the present grayscale value is greater than the target grayscale value, the target grayscale-correction-value corresponding to each type of LED is a negative value, and the obtained target grayscale value corrected is less than the target grayscale value. A driving-current value corresponding to the target grayscale value corrected of each type of LED is determined as the adjusted driving-current value corresponding to each type of LED, according to the preset correspondence corresponding to each type of LED between the grayscale values and the driving-current values.

When the present grayscale value is less than the target grayscale value, the target grayscale-correction-value is set to be the positive value, so that the target grayscale value corrected is greater than the target grayscale value, and the adjusted driving-current value is greater than the target driving-current value. Therefore, a current flowing through the LED is input at a value greater than the target driving-current value first, and then is input at the target driving-current value, so that the ramp-up rate of the current can be improved, and the LED can reach the target driving-current value more quickly, thereby prolonging the conduction time.

When the present grayscale value is greater than the target grayscale value, the target grayscale-correction-value is set to be the negative value, so that the target grayscale value corrected is less than the target grayscale value, and the adjusted driving-current value is less than the target driving-current value. Therefore, a current flowing through the LED is input at a value less than the target driving-current value, and then is input at the target driving-current value, so that the ramp-down rate of the current can be improved, and the LED can reach the target driving-current value more quickly, thereby prolonging the conduction time.

When the multiple types of LEDs include a LED emitting red light, a LED emitting blue light, and a LED emitting green light, and the present grayscale value is less than the target grayscale value, a target grayscale-correction-value corresponding to the LED emitting red light, a target grayscale-correction-value corresponding to the LED emitting blue light, and a target grayscale-correction-value corresponding to the LED emitting green light each are a positive value. When the present grayscale value is greater than the target grayscale value, the target grayscale-correction-value corresponding to the LED emitting red light, the target grayscale-correction-value corresponding to the LED emitting blue light, and the target grayscale-correction-value corresponding to the LED emitting green light each are a negative value. The target grayscale and the target grayscale-correction-value corresponding to each type of LED are added to obtain the target grayscale value corrected of each type of LED as follows. The target grayscale-correction-value corresponding to the LED emitting red light and the target grayscale value are added to obtain a target grayscale value corrected of the LED emitting red light; the target grayscale-correction-value corresponding to the LED emitting blue light and the target grayscale value are added to obtain a target grayscale value corrected of the LED emitting blue light; and the target grayscale-correction-value corresponding to the LED emitting green light and the target grayscale value are added to obtain a target grayscale value corrected of the LED emitting green light.

Exemplarily, referring to Table 1 again, when the present grayscale value is 0 and the target grayscale value is 16, the target grayscale-correction-value corresponding to the LED emitting green light is determined as 2, and the target grayscale value corrected corresponding to the LED emitting green light is determined as 18.

In some embodiments, when the LED changes from different present grayscale values to the same target grayscale value, the corresponding target grayscale-correction-values are different. A target grayscale-correction-value corresponding to a larger present grayscale value is less than a target grayscale-correction-value corresponding to a smaller present grayscale value. Accordingly, the target grayscale value corrected corresponding to the larger present grayscale value is less than the target grayscale value corrected correspondingly to the smaller present grayscale value. When the present grayscale value changes from the larger present grayscale value to the target grayscale value, the ramp-up rate required decreases. Therefore, compared to changing from the smaller present grayscale value to the same target grayscale value, the target driving-current value can be reached quickly by providing a relatively small adjusted driving-current value.

Exemplarily, as illustrated in the foregoing Table 1, when the present grayscale value is 0 and the target grayscale value is 112, the corresponding target grayscale-correction-value is 21, and the corresponding target grayscale value corrected is 133; and when the present grayscale value is 16 and the target grayscale value is 112, the corresponding target grayscale-correction-value is 19, the corresponding modified target grayscale value is 131, where the target grayscale value corrected decreases with the decrease of the target grayscale-correction-value. When changing from the present grayscale value of 0 to the target grayscale value of 112, compared to changing from the present grayscale value 16 to the target grayscale value 112, the target driving-current value corresponding to the target grayscale value of 112 can be reached quickly by providing a relatively small adjusted driving-current value.

In other embodiments, when the LED changes from different present grayscale values to the same target grayscale value, the corresponding target grayscale-correction-values are different. A target grayscale-correction-value corresponding to a larger present grayscale value is greater than a target grayscale-correction-value corresponding to a smaller present grayscale value.

In other embodiments, when the LED change from different present grayscale values to the same target grayscale value, the corresponding target grayscale-correction-values may be the same.

In some embodiments, when the LED changes from the same present grayscale value to different target grayscale values, as the target grayscale value increases, the corresponding target grayscale-correction-value increases first and then decreases. Exemplarily, as illustrated in the foregoing Table 1, when the present grayscale value is 0 and the target grayscale value is 48, the corresponding target grayscale-correction-value is 6. When the present grayscale value is 0 and the target grayscale value is 112, the corresponding target grayscale-correction-value is 21. When the present grayscale value is 0 and the target grayscale value is 208, the corresponding target grayscale-correction-value is 14.

In other embodiments, when the LED change from the same present grayscale value to different target grayscale values, the corresponding target grayscale-correction-values are the same. Exemplarily, as illustrated in the foregoing Table 1, when the present grayscale value is 32 and the target grayscale value is 224, the corresponding target grayscale-correction-value is 8. When the present grayscale value is 32 and the target grayscale value is 240, the corresponding target grayscale-correction-value is 8.

In some embodiments, the target driving-current values corresponding to the multiple types of LEDs are obtained as follows. A target grayscale value of the display panel is obtained. The target driving-current values corresponding to the multiple types of LEDs are obtained, according to the target grayscale value, where the target driving-current values corresponding to the multiple types of LEDs are different.

The target driving-current values corresponding to the multiple types of LEDs are the same, so that the multiple types of LEDs can emit light with the same brightness. Change relationships between the driving-current value and the grayscale value of multiple types of LEDs are different, so that target driving-current values corresponding to the multiple types of LEDs are different.

In some embodiments, as described above, each type of LED corresponds to a preset correspondence between grayscale values and driving-current values. The preset correspondence between the grayscale values and the driving-current values defines that the grayscale values are positively correlated with the driving-current values. The target driving-current values corresponding to the multiple types of LEDs are determined, according to the target grayscale value, as follows. According to the preset correspondence corresponding to each type of LED between the grayscale values and the driving-current values, a driving-current value corresponding to each type of LED at the target grayscale value is determined as the target driving-current value, to obtain the target driving-current values corresponding to all LEDs at the target grayscale value.

Exemplarily, the target driving-current value corresponding to each type of LED may be determined according to the schematic diagram of the relationship between the grayscale values and the driving-current values as illustrated in FIG. 8 and the target grayscale value.

Figure 9:
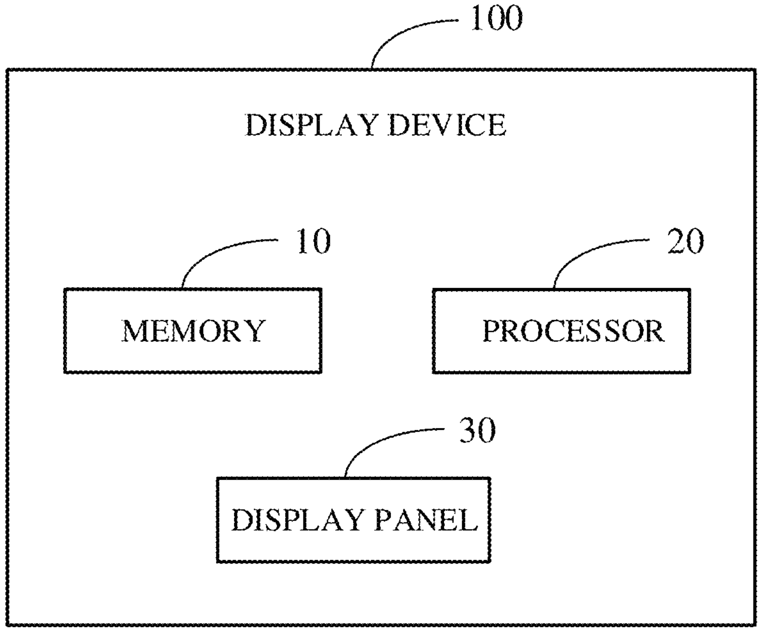
FIG. 9 is a structural block diagram of a display device provided in an embodiment of the present disclosure.

Reference can be made to FIG. 9, where FIG. 9 is a structural block diagram of a display device 100 provided in an embodiment of the present disclosure. In some embodiments, as illustrated in FIG. 9, the display device 100 includes the display panel 30, a memory 10, and a processor 20. The memory 10 is configured to store computer programs. The processor 20 is configured to invoke the computer programs to execute the driving method for the display panel provided in any one of the forgoing embodiments.

The display device 100 may be a television, a mobile phone, a tablet, a computer, an electronic display screen, and other electronic devices having a display function.

The memory 10 may be a flash memory disk, a Read-Only Memory (ROM), a Random Access Memory (RAM), a magnetic disk, or a compact disk. The processor 20 may be a processing chip such as a single chip microcomputer, a Central Processing Unit (CPU), or a Digital Signal Processor (DSP).

In some embodiments, before providing the currents having the corresponding adjusted driving-current values to the multiple types of LEDs respectively, the processor 20 is configured to invoke the computer programs to execute obtaining the present grayscale value and the target grayscale value of the display panel, and determining adjusted driving-current values corresponding to the multiple types of LEDs according to the present grayscale value and the target grayscale value.

In some embodiments, when the present grayscale value is less than the target grayscale value, the processor 20 is configured to invoke the computer programs to execute determining the adjusted driving-current values corresponding to the multiple types of LEDs to be greater than target driving-current values corresponding to the multiple types of LEDs respectively. When the present grayscale value is greater than the target grayscale value, the processor 20 is configured to invoke the computer programs to execute determining the adjusted driving-current values corresponding to the multiple types of LEDs to be less than the target driving-current values corresponding to the multiple types LEDs.

In some embodiments, in terms of determining the adjusted driving-current values corresponding to the multiple types of LEDs, according to the present grayscale value and the target grayscale value, the processor 20 is further configured to invoke the computer programs to execute determining a target grayscale-correction-value corresponding to each type of LED, according to the present grayscale value and the target grayscale value; and determining the adjusted driving-current value corresponding to each type of LED, according to the target grayscale value and the target grayscale-correction-value corresponding to each type of LED.

In some embodiments, in terms of determining the target grayscale-correction-value corresponding to each type of LED, according to the present grayscale value and the target grayscale value, the processor 20 is configured to invoke the computer programs to execute determining the target grayscale-correction-value corresponding to each type of LED, according to the present grayscale value, the target grayscale value, and a preset grayscale-correction-value lookup table, where the grayscale-correction-value lookup table records a correspondence between present grayscale values, target grayscale values, and grayscale correction values of each type of LED; and determining the adjusted driving-current value corresponding to each type of LED, according to the target grayscale value and the target grayscale-correction-value corresponding to each type of LED.

In some embodiments, each type of LED corresponds to a preset correspondence between grayscale values and driving-current values, and the preset correspondence between the grayscale values and the driving-current values defines that the grayscale values are positively correlated with the driving-current values. In terms of determining the adjusted driving-current value corresponding to each type of LED, according to the target grayscale value and the target grayscale-correction-value corresponding to each type of LED, the processor 20 is configured to invoke the computer programs to execute adding the target grayscale value and the target grayscale-correction-value corresponding to each type of LED, to obtain a target grayscale value corrected of each type of LED, where when the present grayscale value is less than the target grayscale value, the target grayscale-correction-value corresponding to each type of LED is a positive value, and an obtained target grayscale value corrected is greater than the target grayscale value, and when the present grayscale value is greater than the target grayscale value, the target grayscale-correction-value corresponding to each type of LED is a negative value, and the obtained target grayscale value corrected is less than the target grayscale value; and determining a driving-current value corresponding to the target grayscale value corrected of each type of LED as the adjusted driving-current value corresponding to each type of LED, according to the preset correspondence corresponding to each type of LED between the grayscale values and the driving-current values.

In some embodiments, in terms of obtaining the target driving-current values corresponding to the multiple types of LEDs, the processor 20 is configured to invoke the computer programs to execute obtaining a target grayscale value of the display panel; and determining the target driving-current values corresponding to the multiple types of LEDs, according to the target grayscale value, where the target driving-current values corresponding to the multiple types of LEDs are different.

In some embodiments, each type of LED corresponds to a preset correspondence between grayscale values and driving-current values, and the preset correspondence between the grayscale values and the driving-current values defines that the grayscale values are positively correlated with the driving-current values. In terms of determining the target driving-current values corresponding to the multiple types of LEDs, according to the target grayscale value, the processor 20 is configured to invoke the computer programs to execute determining, according to the preset correspondence corresponding to each type of LED between the grayscale values and the driving-current values, a driving-current value corresponding to each type of LED at the target grayscale value as the target driving-current value, to obtain the target driving-current values corresponding to all LEDs at the target grayscale value.

The above corresponds to the foregoing driving method for the display panel. For more detailed description, reference can be made to the contents of various embodiments of the forgoing driving method for the display panel. The content of the display device 100 and the content of the forgoing driving method for the display panel can also be referred to each other.

A non-transitory computer-readable storage medium is further provided in embodiments of the present disclosure. The non-transitory computer-readable storage medium is configured to store computer programs which, after being invoked by a processor, are operable with the processor to implement the driving method for the display panel provided in any one of the foregoing embodiments.

Those of ordinary skill in the art may understand that all or some of the processes in the methods of the above embodiments can be realized by using computer programs to instruct corresponding hardware. The programs may be stored in a computer-readable memory. The memory may be a flash disk, a ROM, a RAM, a magnetic disk, a compact disc, or the like.

It should be noted that for the sake of simplicity, the foregoing method embodiments are described as a series of action combinations. However, it will be appreciated by those skilled in the art that the present disclosure is not limited by the sequence of actions described. According to the present disclosure, some processes may be performed in other orders or simultaneously. Besides, it will be appreciated by those skilled in the art that the embodiments described in the specification are exemplary embodiments, and the actions and modules involved are not necessarily essential to the present disclosure.

In the foregoing embodiments, the description of each embodiment has respective focuses. For a part that is not described in detail in a certain embodiment, reference may be made to related descriptions in other embodiments.

The foregoing are embodiments of the present disclosure. It should be noted that, a person of ordinary skill in the art may further make improvements and corrections without departing from the principle of the embodiments of the present disclosure, and these improvements and corrections shall also belong to the scope of protection of the present disclosure. The foregoing illustrates implementations of the present disclosure. It should be pointed out that for those of ordinary skill in the art, various improvements and modifications can be made without departing from the principle of the embodiments of the present disclosure. These improvements and modifications also deemed to fall within the scope of protection of the present disclosure.

What is claimed is:

1. A driving method for a display panel, wherein the display panel comprises a plurality of types of Light-Emitting Diodes (LEDs), different types of LEDs have different light-emitting colors, and the driving method for the display panel comprises:

obtaining a target grayscale value of the display panel;

determining, according to a preset correspondence corresponding to each type of LED between grayscale values and driving-current values, a driving-current value corresponding to each type of LED at the target grayscale value as a target driving-current value, to obtain target driving-current values corresponding to all LEDs at the target grayscale value, wherein the target driving-current values corresponding to the plurality of types of LEDs are different, and the preset correspondence between the grayscale values and the driving-current values defines that the grayscale values are positively correlated with the driving-current values;

providing currents having corresponding adjusted driving-current values for the plurality of types of LEDs respectively, wherein said each type of LED corresponds to an adjusted driving-current value, and for said each type of LED, the adjusted driving-current value corresponding to the type of LED is different from the target driving-current value corresponding to the type of LED; and providing currents having corresponding target driving-current values for the plurality of types of LEDs respectively.

2. The driving method for the display panel of claim 1, wherein before providing the currents having the corresponding adjusted driving-current values for the plurality of types of LEDs, the driving method for the display panel further comprises:

obtaining a present grayscale value of the display panel; and determining the adjusted driving-current values corresponding to the plurality of types of LEDs, according to the present grayscale value and the target grayscale value.

3. The driving method for the display panel of claim 2, wherein determining the adjusted driving-current values corresponding to the plurality of types of LEDs, according to the present grayscale value and the target grayscale value comprises:

determining the adjusted driving-current value corresponding to the type of LED to be greater than the target driving-current value corresponding to the type of LED, when the present grayscale value is less than the target grayscale value; and determining the adjusted driving-current value corresponding to the type of LED to be less than the target driving-current value corresponding to the type of LED, when the present grayscale value is greater than the target grayscale value.

4. The driving method for the display panel of claim 3, wherein determining the adjusted driving-current values corresponding to the plurality of types of LEDs, according to the present grayscale value and the target grayscale value comprises:

determining a target grayscale-correction-value corresponding to the type of LED, according to the present grayscale value and the target grayscale value; and determining the adjusted driving-current value corresponding to the type of LED, according to the target grayscale value and the target grayscale-correction-value corresponding to the type of LED.

5. The driving method for the display panel of claim 2, wherein determining the adjusted driving-current values corresponding to the plurality of types of LEDs, according to the present grayscale value and the target grayscale value comprises:

determining a target grayscale-correction-value corresponding to the type of LED, according to the present grayscale value and the target grayscale value; and determining the adjusted driving-current value corresponding to the type of LED, according to the target grayscale value and the target grayscale-correction-value corresponding to the type of LED.

6. The driving method for the display panel of claim 5, wherein determining the target grayscale-correction-value corresponding to the type of LED, according to the present grayscale value and the target grayscale value comprises:

determining the target grayscale-correction-value corresponding to the type of LED, according to the present grayscale value, the target grayscale value, and a preset grayscale-correction-value lookup table, wherein the grayscale-correction-value lookup table records a correspondence between present grayscale values, target grayscale values, and grayscale correction values of the type of LED; and determining the adjusted driving-current value corresponding to the type of LED, according to the target grayscale value and the target grayscale-correction-value corresponding to the type of LED.

7. The driving method for the display panel of claim 6, wherein determining the adjusted driving-current value corresponding to the type of LED, according to the target grayscale value and the target grayscale-correction-value corresponding to the type of LED comprises:

adding the target grayscale value and the target grayscale-correction-value corresponding to the type of LED, to obtain a target grayscale value corrected of the type of LED, wherein when the present grayscale value is less than the target grayscale value, the target grayscale-correction-value corresponding to the type of LED is a positive value, and an obtained target grayscale value corrected is greater than the target grayscale value; and when the present grayscale value is greater than the target grayscale value, the target grayscale-correction-value corresponding to the type of LED is a negative value, and the obtained target grayscale value corrected is less than the target grayscale value; and determining a driving-current value corresponding to the target grayscale value corrected of the type of LED as the adjusted driving-current value corresponding to the type of LED, according to the preset correspondence corresponding to the type of LED between the grayscale values and the driving-current values.

8. The driving method for the display panel of claim 1, wherein the plurality of types of LEDs comprises three types of LEDs, light-emitting colors of the three types of LEDs are red, blue, and green respectively, and the number of LEDs of the type of LED is at least one.

9. A display device, comprising a display panel, a memory, and a processor, wherein the memory is configured to store computer programs, and the processor is configured to invoke the computer programs to execute a driving method for the display panel; wherein the display panel comprises a plurality of types of Light-Emitting Diodes (LEDs), different types of LEDs have different light-emitting colors, and the processor is configured to invoke the computer programs to execute:

obtaining a target grayscale value of the display panel;

determining, according to a preset correspondence corresponding to each type of LED between grayscale values and driving-current values, a driving-current value corresponding to each type of LED at the target grayscale value as a target driving-current value, to obtain target driving-current values corresponding to all LEDs at the target grayscale value, wherein the target driving-current values corresponding to the plurality of types of LEDs are different, and the preset correspondence between the grayscale values and the driving-current values defines that the grayscale values are positively correlated with the driving-current values;

providing currents having corresponding adjusted driving-current values for the plurality of types of LEDs respectively, wherein said each type of LED corresponds to an adjusted driving-current value, and for said each type of LED, the adjusted driving-current value corresponding to the type of LED is different from the target driving-current value corresponding to the type of LED; and providing currents having corresponding target driving-current values for the plurality of types of LEDs respectively.

10. The display device of claim 9, wherein before providing the currents having the corresponding adjusted driving-current values for the plurality of types of LEDs, the processor is further configured to invoke the computer programs to execute:

obtaining a present grayscale value of the display panel; and determining the adjusted driving-current values corresponding to the plurality of types of LEDs, according to the present grayscale value and the target grayscale value.

11. The display device of claim 10, wherein in terms of determining the adjusted driving-current values corresponding to the plurality of types of LEDs, according to the present grayscale value and the target grayscale value, the processor is further configured to invoke the computer programs to execute:

for the type of LED, determining the adjusted driving-current value corresponding to the type of LED to be greater than the target driving-current value corresponding to the type of LED, when the present grayscale value is less than the target grayscale value; and for the type of LED, determining the adjusted driving-current value corresponding to the type of LED to be less than the target driving-current value corresponding to the type of LED, when the present grayscale value is greater than the target grayscale value.

12. The display device of claim 11, wherein in terms of determining the adjusted driving-current values corresponding to the plurality of types of LEDs, according to the present grayscale value and the target grayscale value, the processor is further configured to invoke the computer programs to execute:

determining a target grayscale-correction-value corresponding to the type of LED, according to the present grayscale value and the target grayscale value; and determining the adjusted driving-current value corresponding to the type of LED, according to the target grayscale value and the target grayscale-correction-value corresponding to the type of LED.

13. The display device of claim 10, wherein in terms of determining the adjusted driving-current values corresponding to the plurality of types of LEDs, according to the present grayscale value and the target grayscale value, the processor is further configured to invoke the computer programs to execute:

determining a target grayscale-correction-value corresponding to the type of LED, according to the present grayscale value and the target grayscale value; and determining the adjusted driving-current value corresponding to the type of LED, according to the target grayscale value and the target grayscale-correction-value corresponding to the type of LED.

14. The display device of claim 13, wherein in terms of determining the target grayscale-correction-value corresponding to the type of LED, according to the present grayscale value and the target grayscale value, the processor is further configured to invoke the computer programs to execute:

determining the target grayscale-correction-value corresponding to the type of LED, according to the present grayscale value, the target grayscale value, and a preset grayscale-correction-value lookup table, wherein the grayscale-correction-value lookup table records a correspondence between present grayscale values, target grayscale values, and grayscale correction values of the type of LED; and determining the adjusted driving-current value corresponding to the type of LED, according to the target grayscale value and the target grayscale-correction-value corresponding to the type of LED.

15. The display device of claim 14, wherein in terms of determining the adjusted driving-current value corresponding to the type of LED, according to the target grayscale value and the target grayscale-correction-value corresponding to the type of LED, the processor is further configured to invoke the computer programs to execute:

adding the target grayscale value and the target grayscale-correction-value corresponding to the type of LED, to obtain a target grayscale value corrected of the type of LED, wherein when the present grayscale value is less than the target grayscale value, the target grayscale-correction-value corresponding to the type of LED is a positive value, and an obtained target grayscale value corrected is greater than the target grayscale value; and when the present grayscale value is greater than the target grayscale value, the target grayscale-correction-value corresponding to the type of LED is a negative value, and the obtained target grayscale value corrected is less than the target grayscale value; and determining a driving-current value corresponding to the target grayscale value corrected of the type of LED as the adjusted driving-current value corresponding to the type of LED, according to the preset correspondence corresponding to the type of LED between the grayscale values and the driving-current values.

16. The display device of claim 9, wherein the plurality of types of LEDs comprises three types of LEDs, light-emitting colors of the three types of LEDs are red, blue, and green respectively, and the number of LEDs of the type of LED is at least one.

17. A driving method for a display panel, wherein the display panel comprises a plurality of types of Light-Emitting Diodes (LEDs), different types of LEDs have different light-emitting colors, and the driving method for the display panel comprises:

obtaining target driving-current values corresponding to the plurality of types of LEDs, wherein each type of LED corresponds to a target driving-current value;

providing currents having corresponding adjusted driving-current values for the plurality of types of LEDs respectively, wherein said each type of LED corresponds to an adjusted driving-current value, and for said each type of LED, the adjusted driving-current value corresponding to the type of LED is different from the target driving-current value corresponding to the type of LED; and providing currents having corresponding target driving-current values for the plurality of types of LEDs respectively;

wherein before providing the currents having the corresponding adjusted driving-current values for the plurality of types of LEDs, the driving method for the display panel further comprises:

obtaining a present grayscale value of the display panel and a target grayscale value of the display panel; and determining the adjusted driving-current values corresponding to the plurality of types of LEDs, according to the present grayscale value and the target grayscale value;

wherein determining the adjusted driving-current values corresponding to the plurality of types of LEDs, according to the present grayscale value and the target grayscale value comprises:

determining a target grayscale-correction-value corresponding to the type of LED, according to the present grayscale value and the target grayscale value;

adding the target grayscale value and the target grayscale-correction-value corresponding to the type of LED, to obtain a target grayscale value corrected of the type of LED, wherein when the present grayscale value is less than the target grayscale value, the target grayscale-correction-value corresponding to the type of LED is a positive value, and an obtained target grayscale value corrected is greater than the target grayscale value; and when the present grayscale value is greater than the target grayscale value, the target grayscale-correction-value corresponding to the type of LED is a negative value, and the obtained target grayscale value corrected is less than the target grayscale value; and determining a driving-current value corresponding to the target grayscale value corrected of the type of LED as the adjusted driving-current value corresponding to the type of LED, according to a preset correspondence corresponding to said each type of LED between grayscale values and driving-current values, wherein the preset correspondence between the grayscale values and the driving-current values defines that the grayscale values are positively correlated with the driving-current values.

* * * * *